Dec. 15, 1925.
E. H. BAKER
1,565,889
DISPLAY RACK AND CONTAINER
Filed June 21, 1923
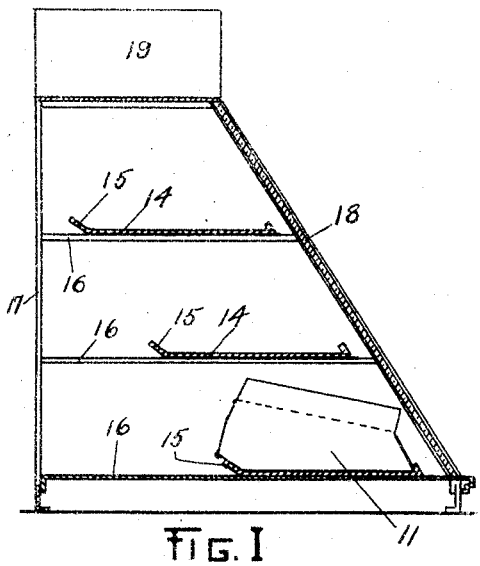
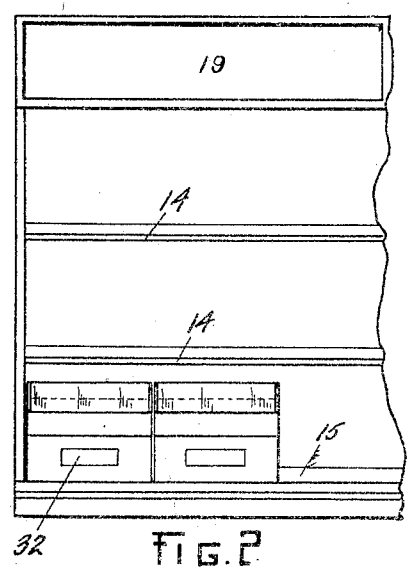
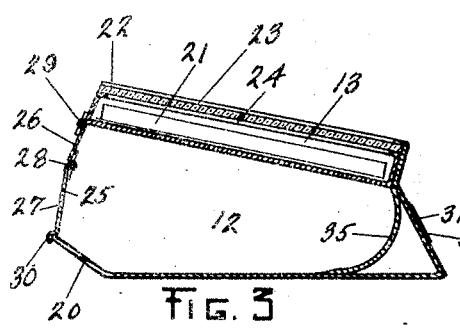
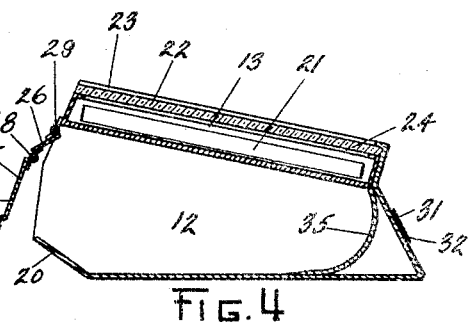
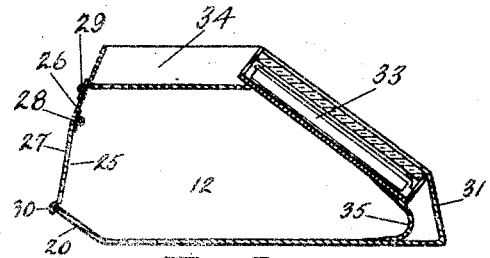
Inventor
Edward H. Baker
By Clarence S. Walker
His Attorney Patented Dec. 15, 1925.

1,565,886

UNITED STATES PATENT OFFICE.

EDWARD H. BAKER, OF JAMESTOWN, NEW YORK.

DISPLAY RACK AND CONTAINER.

Application filed June 21, 1923. Serial No. 646,970.

*To all whom it may concern:*

Be it known that EDWARD H. BAKER, a citizen of the United States, residing in the city of Jamestown, in the county of Chautauqua and State of New York, has invented certain new and useful Improvements in a Display Rack and Container, of which the following, taken in connection with the accompanying drawings, is a specification.

This invention relates to an improvement in a display rack and container and more particularly to such devices employed in connection with the sale of candy or other confections.

The problem confronted by many retailers is how candy and other confections, which deteriorate on exposure to the air, can be properly displayed, and at the same time sales can be made without interfering with the display.

Candy is usually sold to the retailer in large boxes having on the top a pasteboard tray in which a single layer of the candy is carefully arranged. This tray shows in pleasing array the type of candy in the box, but it is obviously impossible to keep the tray intact and at the same time sell the candy directly from the box. Moreover, if the cover of the box is removed, so that the tray is visible, the candy in the tray is directly exposed to the air and soon deteriorates both in quality and appearance.

The chief object of this invention is to provide a display rack having a plurality of shelves on which suitably formed containers for the candy are placed, so that the candy in the tray is exposed as a sample without interfering with the sale of the remaining candy in the box.

A further object of this invention is to provide a container for candy or the like having a display compartment and a storage compartment.

Another object of this invention is to provide a container for candy and the like having an upper glass covered compartment in which samples of the candy are arranged for observation and a storage compartment in which the remainder of the candy is placed out of sight of the purchaser, such section being provided with hinged rear wall to allow removal and sale of the candy without in any way interfering with the display.

Other objects will appear from the following specification taken in connection with the drawings which form a part thereof, and in which—

Fig. 1 is a side elevation in section of a display rack embodying one form of this invention and provided with a single container;

Fig. 2 is a front elevation of a portion of such rack;

Fig. 3 is an enlarged longitudinal cross section of a container embodying one form of this invention;

Fig. 4 is a view similar to Fig. 3, the rear wall being shown partly open; and

Fig. 5 is a similar sectional view of a modification of this invention.

Referring to the drawings, the reference numeral 10 is employed to designate a display rack in which are supported a plurality of containers 11 having a storage compartment 12 and a display compartment 13.

The rack 10 is provided with a plurality of suitably arranged shelves 14, the inner edges of which are provided with rearwardly inclined surfaces 15 for a purpose to be described later. As here shown, the shelves 14 are supported upon suitable straps 16 extending from the rear wall 17 to the front wall 18. The front wall 18 is preferably inclined and is made partly of glass so that the shelves and their contents can be easily observed. At the top of the rack is provided a glass covered section 19, in which chewing gum and small packages of candy can be displayed.

The container 11 is preferably made of sheet metal and the rear edge of the bottom is inclined as indicated by the numeral 20 at the same angle as the surface 15 of the shelves 14. Thus, when the container is placed upon the shelves, the portion 20 of the container is brought in contact with the portion 15 of the shelves and the container is properly positioned upon the shelf. The upper compartment 13 is shallow to receive the pasteboard tray 21 with which, as previously pointed out, the large box of candy is provided. This tray 21 carries simply a single, pleasingly arrayed, layer of candy and when used as intended by this invention, designates the type of candy in the container.

The compartment 13 is closed by a slidable glass top 22 which is supported between the flanges 23, 24 as indicated in the drawing. The remaining candy from the box is placed in the storage compartment 12 and is thus concealed from the purchaser. The rear wall 25 of the compartment 12 is made up of sections 26, 27 hingedly connected at 28.

The upper section 26 is hinged at 29 to the rear wall of the upper compartment 13. The lower edge of the section 27 is provided with a cupped flange 30 which, when the rear wall is in the position shown in Fig. 3, encloses the rear edge of the portion 20, thus protecting the candy in the compartment from the dust.

The front wall 31 of the container 11 is provided with a curved inner wall 35, which is secured at one end to the wall 31, and at the other to the bottom of the container.

This wall 35 permits the ready removal of candy by means of a scoop and insures a clean compartment due to the elimination of all corners, in which pieces of broken candy might collect and be overlooked when said compartment is cleaned.

On the front face 31 of the lower compartment may be placed a suitable label or other placard 32 indicating the kind or make of the candy in the container.

In Fig. 5 is shown a modification in which there is provided a compartment 33 inclined at a greater angle than the compartment 13 in the other modification. The edge of this is, of course apparent when under certain circumstances, a container of the type shown in Fig. 3 would not properly display the candy in the compartment 13.

In addition to the compartment 33 there is also provided a compartment 34, which may be open as disclosed, or else protected, and in which gum or other package goods may be placed.

While two embodiments only of this invention have been shown and described, I am not to be limited thereto since it is obvious that others may be made without departing from the spirit and scope of the invention as set forth in the following claims.

Having thus set forth my invention what I claim as new and for which I desire protection by Letters Patent is:

1. A container for merchandise having an upper and a lower compartment, the said lower compartment being adapted to hold the main supply of merchandise, the bottom of said lower compartment being inclined rearwardly and upwardly adjacent its rear end and the rear wall thereof consisting of two hinged sections and having means to engage the upper rear edge of said upwardly inclined end, and the front of said container being rearwardly and upwardly inclined, whereby the said container may be interlocked with a receptacle in a show or other case and fixed in a predetermined position within the latter.

2. A container for merchandise having an upper and a lower compartment, the lower compartment being adapted to hold the main supply of merchandise, the bottom of said compartment being inclined rearwardly and upwardly adjacent its rear end and the front of said container being rearwardly and upwardly inclined whereby said container may be interlocked with a receptacle in a show or other case and fixed in a predetermined position with the latter.

In testimony whereof I have affixed my signature.

EDWARD H. BAKER.